(12) United States Patent
Khan et al.

(10) Patent No.: US 12,352,571 B2
(45) Date of Patent: Jul. 8, 2025

(54) IN-SITU RESIDUAL INTENSITY NOISE MEASUREMENT METHOD AND SYSTEM

(71) Applicant: EMCORE Corporation, Alhambra, CA (US)

(72) Inventors: Jan Amir Khan, Windsor, CT (US); Vijay Ramareddy, Revere, MA (US)

(73) Assignee: EMCORE CORPORATION, Alhambra, CA (US)

( * ) Notice: Subject to any disclaimer, the term of this patent is extended or adjusted under 35 U.S.C. 154(b) by 277 days.

(21) Appl. No.: 17/819,102

(22) Filed: Aug. 11, 2022

(65) Prior Publication Data
US 2023/0049259 A1    Feb. 16, 2023

Related U.S. Application Data

(60) Provisional application No. 63/260,151, filed on Aug. 11, 2021.

(51) Int. Cl.
| | | |
|---|---|---|
| *G01B 9/02055* | (2022.01) | |
| *G01B 9/02* | (2022.01) | |
| *G01B 9/02015* | (2022.01) | |
| *G01C 19/72* | (2006.01) | |

(52) U.S. Cl.
CPC ....... *G01B 9/0207* (2013.01); *G01B 9/02024* (2013.01); *G01B 9/02051* (2013.01); *G01C 19/721* (2013.01)

(58) Field of Classification Search
CPC ............ G01B 9/02024; G01B 9/02051; G01B 9/0207; G01C 19/721
See application file for complete search history.

(56) References Cited

U.S. PATENT DOCUMENTS

| | | |
|---|---|---|
| 4,420,259 A | 12/1983 | Taylor |
| 4,678,267 A | 7/1987 | Burns et al. |
| 4,842,358 A | 6/1989 | Hall |
| (Continued) | | |

FOREIGN PATENT DOCUMENTS

| | | |
|---|---|---|
| CN | 205720760 U | 11/2016 |
| CN | 107843957 A | 3/2018 |
| (Continued) | | |

OTHER PUBLICATIONS

Jiang, Zhiguo et al. "Suppression of residual intensity modulation induced error in resonator fiber optic gyroscopes with improved modulation technique". Optics Communications, vol. 459, Mar. 15, 2020. (Year: 2020).*

(Continued)

*Primary Examiner* — Michael A Lyons
(74) *Attorney, Agent, or Firm* — Hamilton, Brook, Smith & Reynolds, P.C.

(57) ABSTRACT

A method of determining residual intensity noise (RIN) of a sensor may comprise determining a first amplitude of a first harmonic of the sensor while a signal propagating through the sensor is modulated at a modulating frequency corresponding to twice an eigenfrequency of the sensor. The method may further comprise determining a second amplitude of a second harmonic of the sensor while the signal propagating through the sensor is modulated the modulating frequency, and determining the RIN of the sensor as a ratio of the first amplitude and the second amplitude.

4 Claims, 10 Drawing Sheets

(56) References Cited

U.S. PATENT DOCUMENTS

| | | | |
|---|---|---|---|
| 4,890,922 A | 1/1990 | Wilson | |
| 4,915,503 A | 4/1990 | Pavlath | |
| 4,938,594 A | 7/1990 | Pavlath | |
| 4,969,742 A | 11/1990 | Falk et al. | |
| 5,037,205 A | 8/1991 | Pavlath | |
| 5,194,917 A | 3/1993 | Regener | |
| 5,223,911 A | 6/1993 | Suchoski et al. | |
| 5,321,503 A | 6/1994 | Bramson | |
| 5,363,457 A | 11/1994 | Falt et al. | |
| 5,365,338 A | 11/1994 | Bramson | |
| 5,393,371 A | 2/1995 | Chang et al. | |
| 5,436,992 A | 7/1995 | Wang et al. | |
| 5,475,771 A | 12/1995 | Hosoi | |
| 5,537,671 A | 7/1996 | Toyama et al. | |
| 5,579,424 A | 11/1996 | Schneider | |
| 5,600,745 A | 2/1997 | Wuu et al. | |
| 5,627,644 A | 5/1997 | Sanders | |
| 5,729,641 A | 3/1998 | Chandonnet et al. | |
| 5,838,844 A | 11/1998 | Van et al. | |
| 5,909,305 A | 6/1999 | Kinoshita | |
| 5,946,434 A | 8/1999 | Lee | |
| 5,982,961 A | 11/1999 | Pan et al. | |
| 6,108,086 A | 8/2000 | Michal et al. | |
| 6,140,009 A | 10/2000 | Wolk et al. | |
| 6,163,632 A | 12/2000 | Rickman et al. | |
| 6,293,688 B1 | 9/2001 | Deacon | |
| 6,298,178 B1 | 10/2001 | Day et al. | |
| 6,360,038 B1 | 3/2002 | Grubsky et al. | |
| 6,445,455 B1 | 9/2002 | Hall et al. | |
| 6,490,045 B1* | 12/2002 | Dakin | G01D 5/35322 356/483 |
| 6,584,240 B2 | 6/2003 | Doi et al. | |
| 6,680,472 B1 | 1/2004 | Thingboe et al. | |
| 6,760,520 B1 | 7/2004 | Medin et al. | |
| 6,778,751 B2 | 8/2004 | Tada et al. | |
| 6,905,904 B2 | 6/2005 | Gardner et al. | |
| 6,920,257 B1 | 7/2005 | Mekis et al. | |
| 7,061,610 B2 | 6/2006 | Mittelstein et al. | |
| 7,085,441 B1 | 8/2006 | Kozlov | |
| 7,218,809 B2 | 5/2007 | Zhou et al. | |
| 7,224,878 B1 | 5/2007 | Wessels et al. | |
| 7,426,326 B2 | 9/2008 | Moeller et al. | |
| 7,711,214 B2 | 5/2010 | Tsuzuki et al. | |
| 7,783,146 B2 | 8/2010 | Blauvelt et al. | |
| 7,899,286 B2 | 3/2011 | Yoshida | |
| 8,121,874 B1 | 2/2012 | Guheen et al. | |
| 9,411,098 B2 | 8/2016 | Onaka | |
| 9,664,931 B1 | 5/2017 | Yap et al. | |
| 9,690,045 B2 | 6/2017 | Goodwill et al. | |
| 9,739,938 B2 | 8/2017 | Shi et al. | |
| 9,746,612 B2 | 8/2017 | Lipson et al. | |
| 9,952,456 B2 | 4/2018 | Huang | |
| 10,018,789 B2 | 7/2018 | Wang et al. | |
| 10,108,789 B2 | 10/2018 | Lehmann et al. | |
| 10,274,319 B2 | 4/2019 | Wang | |
| 10,488,596 B2 | 11/2019 | Akiyama | |
| 10,545,288 B2 | 1/2020 | Ma et al. | |
| 10,921,682 B1 | 2/2021 | Wang | |
| 11,092,748 B2 | 8/2021 | Wang et al. | |
| 11,320,267 B2 | 5/2022 | Wang | |
| 11,353,655 B2 | 6/2022 | Wang et al. | |
| 11,415,419 B2 | 8/2022 | Wang et al. | |
| 12,136,681 B2 | 11/2024 | Wang et al. | |
| 2002/0003918 A1 | 1/2002 | Ooi et al. | |
| 2002/0024786 A1 | 2/2002 | Shearon et al. | |
| 2002/0149780 A1 | 10/2002 | Trinh | |
| 2002/0197037 A1 | 12/2002 | Bailey et al. | |
| 2003/0081092 A1 | 5/2003 | Ishizuka et al. | |
| 2003/0081902 A1 | 5/2003 | Blauvelt et al. | |
| 2004/0057667 A1 | 3/2004 | Yamada et al. | |
| 2004/0168234 P1 | 8/2004 | Fischer | |
| 2004/0223695 A1 | 11/2004 | Kersten et al. | |
| 2005/0021348 A1 | 1/2005 | Chan et al. | |
| 2005/0025427 A1 | 2/2005 | Dougherty et al. | |
| 2006/0133754 A1 | 6/2006 | Patel et al. | |
| 2006/0251849 A1 | 11/2006 | Blauvelt et al. | |
| 2007/0053625 A1 | 3/2007 | Chioka et al. | |
| 2007/0229838 A1 | 10/2007 | Greening et al. | |
| 2008/0024786 A1 | 1/2008 | Sanders | |
| 2008/0166095 A1 | 7/2008 | Popovic et al. | |
| 2008/0291459 A1 | 11/2008 | Meyer et al. | |
| 2009/0087144 A1 | 4/2009 | Yoshida | |
| 2009/0190876 A1 | 7/2009 | Doi | |
| 2010/0137849 A1 | 6/2010 | Hanft et al. | |
| 2010/0245834 A1* | 9/2010 | Strandjord | G01C 19/721 356/463 |
| 2011/0064355 A1 | 3/2011 | Soma et al. | |
| 2012/0217419 A1 | 8/2012 | Riesen et al. | |
| 2013/0202250 A1 | 8/2013 | Guattari et al. | |
| 2013/0308897 A1 | 11/2013 | Sercel et al. | |
| 2014/0075357 A1 | 3/2014 | Flores et al. | |
| 2014/0185979 A1 | 7/2014 | Evans et al. | |
| 2014/0376001 A1 | 12/2014 | Swanson | |
| 2014/0376083 A1 | 12/2014 | Onaka | |
| 2015/0021291 A1 | 1/2015 | Shastri et al. | |
| 2015/0027042 A1 | 1/2015 | Goodwin et al. | |
| 2015/0205181 A1 | 7/2015 | Kondou | |
| 2015/0212271 A1 | 7/2015 | Chen | |
| 2015/0277042 A1 | 10/2015 | Goodwill et al. | |
| 2015/0277156 A1 | 10/2015 | Kondou | |
| 2016/0357085 A1 | 12/2016 | Jewart et al. | |
| 2017/0131472 A1 | 5/2017 | Kobyakov et al. | |
| 2017/0168234 A1 | 6/2017 | Shi et al. | |
| 2017/0192171 A1 | 7/2017 | Shi et al. | |
| 2017/0205578 A1 | 7/2017 | Van et al. | |
| 2017/0205583 A1 | 7/2017 | Bennett et al. | |
| 2017/0329082 A1 | 11/2017 | Ma et al. | |
| 2018/0120504 A1 | 5/2018 | Qi et al. | |
| 2018/0259337 A1 | 9/2018 | Wang | |
| 2018/0274926 A1 | 9/2018 | Wang | |
| 2019/0086614 A1 | 3/2019 | Wang et al. | |
| 2019/0384076 A1* | 12/2019 | Feke | G01B 9/02091 |
| 2020/0116489 A1 | 4/2020 | Wang et al. | |
| 2020/0135960 A1 | 4/2020 | Wang et al. | |
| 2020/0371286 A1 | 11/2020 | Wang et al. | |
| 2021/0048721 A1 | 2/2021 | Wang | |
| 2021/0240050 A1 | 8/2021 | Khan | |
| 2023/0168090 A1 | 6/2023 | Khan et al. | |

FOREIGN PATENT DOCUMENTS

| | | |
|---|---|---|
| CN | 112833873 A | 5/2021 |
| EP | 0279603 A2 | 8/1988 |
| EP | 0379520 A1 | 8/1990 |
| EP | 0883000 A1 | 12/1998 |
| EP | 0893671 A2 | 1/1999 |
| EP | 1025422 A1 | 8/2000 |
| EP | 1396741 A1 | 3/2004 |
| EP | 2096408 A2 | 9/2009 |
| EP | 2246663 A2 | 11/2010 |
| EP | 3454101 A1 | 3/2019 |
| GB | 2201256 A | 8/1988 |
| JP | 63-070114 A | 3/1988 |
| JP | 02-275402 A | 11/1990 |
| JP | 02-504080 A | 11/1990 |
| JP | 05-224045 A | 9/1993 |
| JP | 07-022674 A | 1/1995 |
| JP | 08-226822 A | 9/1996 |
| JP | 09-159865 A | 6/1997 |
| JP | 09-159869 A | 6/1997 |
| JP | 2006-276518 A | 10/2006 |
| JP | 2007-025583 A | 2/2007 |
| JP | 2007-272121 A | 10/2007 |
| JP | 2009-103792 A | 5/2009 |
| JP | 2012-078508 A | 4/2012 |
| JP | 2012-215901 A | 11/2012 |
| JP | 2013-255086 A | 12/2013 |
| JP | 2017-518524 A | 7/2017 |
| KR | 10-1990-0008876 B1 | 12/1990 |
| KR | 10-1999-0014060 A | 2/1999 |
| WO | 89/01534 A1 | 2/1989 |
| WO | 89/10534 A1 | 11/1989 |
| WO | 8912082 | 12/1989 |
| WO | 2015/008451 A1 | 1/2015 |

(56) References Cited

FOREIGN PATENT DOCUMENTS

| WO | 2015/108488 A1 | 7/2015 |
| WO | 2016/010528 A1 | 1/2016 |
| WO | 2018/165238 A1 | 9/2018 |
| WO | 2018/175524 A1 | 9/2018 |
| WO | 2019/055663 A1 | 3/2019 |
| WO | 2020/077216 A1 | 4/2020 |
| WO | 2020/092789 A1 | 5/2020 |
| WO | 2020/236569 A1 | 11/2020 |
| WO | 2021/034560 A1 | 2/2021 |
| WO | 2021/154970 A1 | 8/2021 |
| WO | 2023/211518 A2 | 11/2023 |

OTHER PUBLICATIONS

Ying, Diqing et al. "An open-loop RFOG based on harmonic division technique to suppress LD's intensity modulation noise". Optics Communications, vol. 378, Nov. 1, 2016, pp. 10-15. (Year: 2016).*

Zhang, Chengfei et al. "Suppression of residual intensity modulation noise in resonator integrated optic gyro". Optics Communications, vol. 430, Jan. 1, 2019, pp. 358-363. (Year: 2019).*

International Search Report and Written Opinion received for PCT Patent Application No. PCT/US2022/080549, mailed on Dec. 13, 2023, 14 pages.

Bauters, et al., "Ultralow-Loss Planar Si3N4 Waveguide Polarizers," IEEE Photonics Journal, 5(1), Article S/N: 6600207 (2013).

Cheng, Z. J., et al., "Polymer-waveguide-based vertical coupler", Optics Communications, vol. 260, No. 2, Apr. 15, 2006.

Florjanczyk, M., et al., "Tiny spectrometer enables cost-effective space-borne sensing" SPIE Newsroom, 10.1117/2.1200912.002524, 2009.

Garanovich, I., et al., "Nonlinear directional coupler for polychromatic light", Optics Letters vol. 32, Issue 5, pp. 475-477 (2007).

Hammer, M., et al., "Hybrid coupled-mode modeling in 3D: perturbed and coupled channels, and waveguide crossings", Journal of Optical Society of America, vol. 34, No. 3, Mar. 1, 2017.

Hatta, A.M., et al. "Design of the optical core of an integrated ratiometric wavelength monitor" Proceedings 14th European Conference on Integrated Optics: ECIO 08 Eindhoven: Jun. 11-13, 2008, Eindhoven University of Technology, The Netherlands, paper, ThP25.

Hatta, A.M., et al., "A simple integrated ratiometric wavelength monitor based on a directional coupler", Optik 125 (2014) 795-798.

Hochber, M., et al., "Silicon photonics: the next fabless semiconductor industry", IEEE Solid-State Circuits Magazine, IEEE, USA, vol. 5, No. 1, Mar. 1, 2013.

Humaira et al., "Integrated silicon photonic TE-pass polarizer", 2016 Photonics North (PN), IEEE, May 24, 2016 (May 24, 2016), p. 1, XP032939515.

International Preliminary Report on Patentability received for PCT Patent Application No. PCT/US2018/021262, mailed on Feb. 28, 2019, 35 pages.

International Preliminary Report on Patentability received for PCT Patent Application No. PCT/US2018/023472, mailed on Oct. 3, 2019, 9 pages.

International Preliminary Report on Patentability received for PCT Patent Application No. PCT/US2018/050896, mailed on Mar. 26, 2020, 11 pages.

International Preliminary Report on Patentability received for PCT Patent Application No. PCT/US2019/055849, mailed on Apr. 22, 2021, 11 pages.

International Preliminary Report on Patentability received for PCT Patent Application No. PCT/US2019/059195, mailed on May 14, 2021, 9 pages.

International Preliminary Report on Patentability received for PCT Patent Application No. PCT/US2020/033092, mailed on Dec. 2, 2021, 10 pages.

International Preliminary Report on Patentability received for PCT Patent Application No. PCT/US2020/045877, mailed on Mar. 3, 2022, 8 pages.

International Preliminary Report on Patentability received for PCT Patent Application No. PCT/US2021/015454, mailed on Aug. 11, 2022, 11 pages.

International Search Report and Written Opinion received for PCT Patent Application No. PCT/US2018/021262, mailed on Jun. 15, 2018, 16 pages.

International Search Report and Written Opinion received for PCT Patent Application No. PCT/US2018/023472, mailed on Jun. 29, 2018, 11 pages.

International Search Report and Written Opinion received for PCT Patent Application No. PCT/US2018/050896, mailed on Jan. 7, 2019, 14 pages.

International Search Report and Written Opinion received for PCT Patent Application No. PCT/US2019/055849, mailed on Mar. 11, 2020, 14 pages.

International Search Report and Written Opinion received for PCT Patent Application No. PCT/US2019/059195, mailed on Jan. 16, 2020, 11 pages.

International Search Report and Written Opinion received for PCT Patent Application No. PCT/US2020/033092, mailed on Sep. 4, 2020, 12 pages.

International Search Report and Written Opinion received for PCT Patent Application No. PCT/US2020/045877, mailed on Nov. 9, 2020, 10 pages.

International Search Report and Written Opinion received for PCT Patent Application No. PCT/US2021/015454, mailed on Jun. 15, 2021, 13 pages.

Lallier, E., et al., "Laser Oscillation of Single-Mode Channel Waveguide in ND:MGO:LINB03", Electronic Letters, IEEE Stevenage, GB, vol. 26, No. 22, Oct. 26, 1989.

Leijtens, X., et al., "Arrayed Waveguide Gratings", in "Wavelength Filters in Fibre Optics", vol. 123 of the series Springer Series in Optical Sciences pp. 125-187 (date uknown).

Lu, M et al., "Field Patterns of the TE Modes in Ridge-Trough Waveguide", International Journal of Infrared and Millimeter Waves, Kluwer Academic Publishers—Plenum Publishers, NE, vol. 23, No. 8, Aug. 1, 2002.

Muneeb, M., et al., "Silicon-on-insulator shortwave infrared wavelength meter with integrated photodiodes for on-chip laser monitoring", Nov. 3, 2014 | vol. 22 | No. 22 | DOI:10.1364/OE.22.027300 | Optics Express 27300.

Park, H., et al. "Device and Integratino Technology for Silicon Photonic Transmitters", IEEE Journal of Selectred Topics in Quantum Electronics, vol. 17, No. 3, May/Jun. 2011.

Pu, M et al., "Ultra-low-loss inverted taper coupler for silicon-on-insulator ridge waveguide", Optics Communications, Elsevier, Amsterdam, NL, vol. 283, No. 19, Oct. 1, 2010.

Sanders, G., et al., "Improvements to Signal Processing and Component Minaturization of Compact Resonator Fiber Optic Gyroscopes", 2018 Dgon Inertial Sensors and Systems (ISS), IEEE, Sep. 11, 2018.

Seyringer, D., et al., "Arrayed Waveguide Gratings", SPIE Press Book, Dale Published: Jun. 3, 2016, ISBN: 9781510603608, vol. SL16.

Shang. K., et al., "Low-loss compact multilayer silicon nitride platform for 3D photonic integrated circuits" Optics Express, vol. 23, No. 16, Aug. 6, 2015.

Srinivasan, S., et al., "Design of integrated hybrid silicon waveguide optical gyroscope", Optics Express 24988, vol. 22, No. 21, Oct. 20, 2014.

Steier, W.H., et al., "Polymer Electro-Optic Devices for Integrated Optics", Chemical Physics, Amsterdam, NL, vol. 245, No. 1-03, Jul. 1, 1999.

Tan, Y. et al., "Polarization-selective microring resonators", Optics Express, vol. 25, No. 4, Feb. 15, 2017 (Feb. 15, 2017).

Tianhao et al., "An Integrated Low-Voltage Broadband Lithium Niobate Phase Modulator", IEEE Photon I CS Technology Letters, IEEE Service Center, vol. 31, No. 11, Jun. 1, 2019 (Jun. 1, 2019), pp. 889-892, XP011724758.

(56) References Cited

OTHER PUBLICATIONS

Tran, M., et al., "Integrated optical driver for interferometric optical gyroscopes", Optics Express 3827, vol. 25, No. 4, Feb. 20, 2017.
Wang, P., et al. "A Ratiometric Wavelength Measurement Based on a Silicon-on-Insulator Directional Coupler Integrated Device", Sensors 2015, 15 21281.
Wang, P., et al., "Passive photonic integrated ratiometric wavelength monitor with resolution better than 15 pm", vol. 25, No. 3 | Feb. 6, 2017 | Optics Express 2940.
Yu, C., et al., "Stable and Compact Optical Module for Fiber-Optic Gyroscope Application", Fiber and Integrated Optics, 33:306-314, 2014.
Machine Translation of CN-112833873-A (Year: 2021).

\* cited by examiner

IN-SITU RESIDUAL INTENSITY NOISE MEASUREMENT METHOD AND SYSTEM

RELATED APPLICATION

This application claims the benefit of U.S. Provisional Application No. 63/260,151, filed on Aug. 11, 2021. The entire teachings of the above application are incorporated herein by reference.

BACKGROUND

Residual intensity noise (RIN) can provide errors in interferometric sensors by skewing phase, frequency or amplitude measurements of the sensor. Conventionally, in-situ measurements of RIN can change due to phase changes, frequency dependent changes and amplitude changes making RIN measurements during operation difficult. Typically, additional components (e.g., optical circuits, detectors, electronics, and system are required to be added into the sensor to determine the magnitude of RIN and provide means of RIN compensation. Add-on RIN subtraction systems suffer from delay, complexity, additional costs and overall size increases in the sensor package.

SUMMARY

The described embodiments concern Fiber Optic Gyroscopes (FOGs), and techniques for measuring Residual Intensity Noise (RIN) within the FOG system. Described embodiments may employ single frequency modulation and dual frequency modulation measurement techniques that require no additional hardware to accomplish the measurement of RIN in-situ.

The described embodiments may be directed to photonic FOG operating "on eigenfrequency," which means operating the modulation scheme of the FOG such that the modulations frequencies are related to the transit time of light in the associated Sagnac coil. The FOG system eigenfrequency will be a frequency that depends on the coil length, so different FOGs have different eigenfrequencies. A unique attribute of operating a FOG system (or any interferometric-based sensor) on eigenfrequencies is that noise in the system cancels, thereby minimizing RIN within the FOG system. Minimizing RIN is desirable since RIN may contribute errors in both bias and scale factors. Since operating on eigenfrequency minimizes RIN, it is a goal of the FOG system to consistently operate on eigenfrequency.

One consequence of implementing the FOG system on a photonic integrated circuit (PIC) is "intensity noise," which can originate from the FOG light source or be produced as a by-product of modulation implemented on the PIC.

While the initial FOG system eigenfrequency may be determined when the FOG is first fabricated/assembled, certain factors (e.g., temperature, vibration, aging) may operate to change the system eigenfrequency. The described embodiments may be directed to a control loop that determines the actual FOG system eigenfrequency, and adjusts the modulation frequency of the FOG system to cause the FOG system to operate on eigenfrequency.

The embodiments described herein may be used for other sensors in addition to FOGs. For example, the embodiments may be used for current sensors, vibration sensors, etc., that use optic fiber as an intrinsic sensor.

In one aspect, the invention may be a method of determining residual intensity noise (RIN) of a sensor, comprising determining a first amplitude of a first harmonic of the sensor while a signal propagating through the sensor is modulated at a modulating frequency corresponding to twice an eigenfrequency of the sensor. The method may further comprise determining a second amplitude of a second harmonic of the sensor while the signal propagating through the sensor is modulated the modulating frequency, and determining the RIN of the sensor as a ratio of the first amplitude and the second amplitude.

In another aspect, the invention may be a method of determining residual intensity noise (RIN) of an interferometer system, comprising propagating a light signal from a light source through the interferometer system, modulating the light signal at a modulating frequency that is twice an eigenfrequency of the interferometer system, determining a first harmonic amplitude and a second harmonic amplitude produced by the interferometer system, and determining the RIN of the interferometer system as a ratio of the first harmonic amplitude and the second harmonic amplitude.

In another aspect, the invention may be a method of determining residual intensity noise (RIN) of an interferometer system, comprising propagating a light signal from a light source through the interferometer system. During a first interval, the method may comprise modulating the light signal at a first modulating frequency that is an eigenfrequency of the interferometer system, and determining a primary measurement associated with the interferometer system. During a second interval, the method may comprise (i) modulating the light signal at a first modulating frequency that is twice the eigenfrequency of the interferometer system, (ii) determining, using an optical detector, a first harmonic amplitude and a second harmonic amplitude produced by the interferometer system, and (iii) determining the RIN of the interferometer system as a ratio of the first harmonic amplitude and the second harmonic amplitude.

In another aspect, the invention may be a method of tracking an eigenfrequency of an interferometer system, comprising determining residual intensity noise (RIN) of a sensor by determining a first amplitude of a first harmonic of the sensor while a signal propagating through the sensor is modulated at a modulating frequency corresponding to twice a predetermined eigenfrequency of the sensor. The method may further comprise determining a second amplitude of a second harmonic of the sensor while the signal propagating through the sensor is modulated the modulating frequency, and determining the RIN of the sensor as a ratio of the first amplitude and the second amplitude. The method may further comprise repeating the step of determining RIN of the sensor using a modulating frequency selected from a range of frequencies that is centered about the predetermined eigenfrequency, determining a modulating frequency from the range of frequencies that produces a minimal determined RIN, and designating modulating frequency corresponding to the minimal determined RIN as an updated eigenfrequency of the system.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The example embodiments described herein are directed to a photonic FOG system operating "on eigenfrequency" or "on-eigen," which means operating the modulation scheme of the FOG system such that the modulation frequencies match the transit time of the associated Sagnac fiber coil. The eigenfrequency of a FOG system depends, for example, on the Sagnac fiber coil length, so different FOGs may have different eigenfrequencies.

Figure 1A:
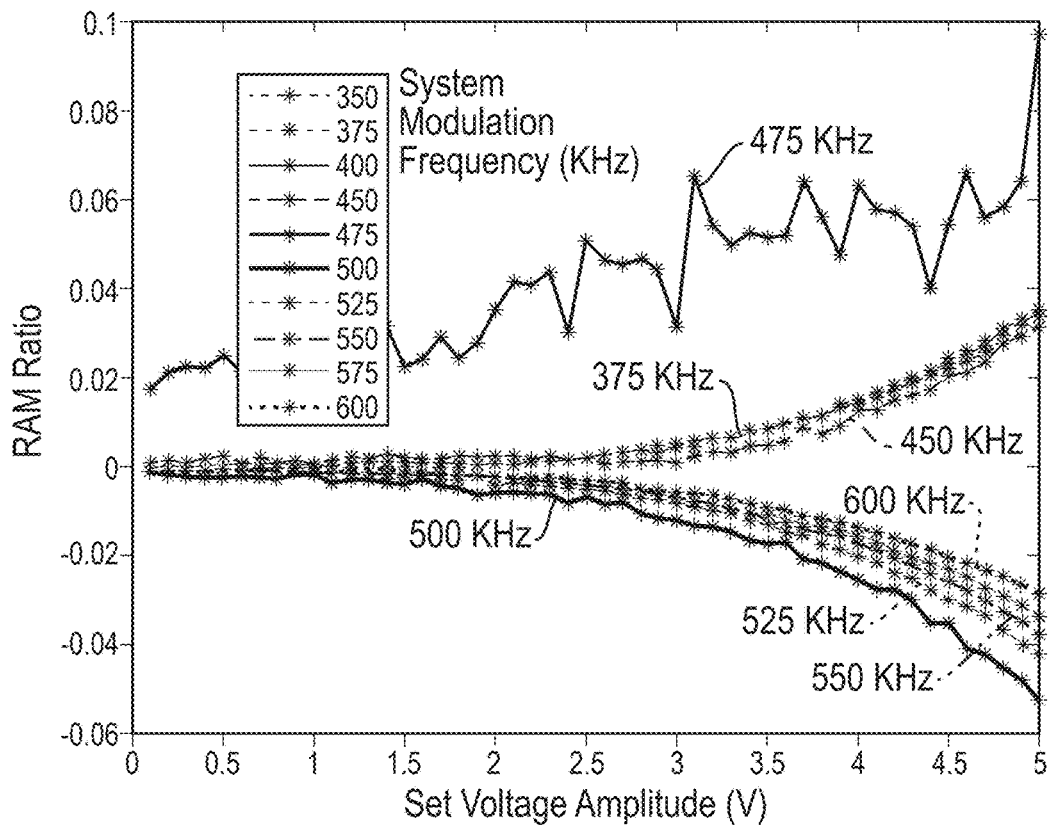
FIGS. 1A and 1B illustrate RIN response with respect to set voltage (i.e., drive voltage) for a number of modulation frequencies.
Figure 1B:
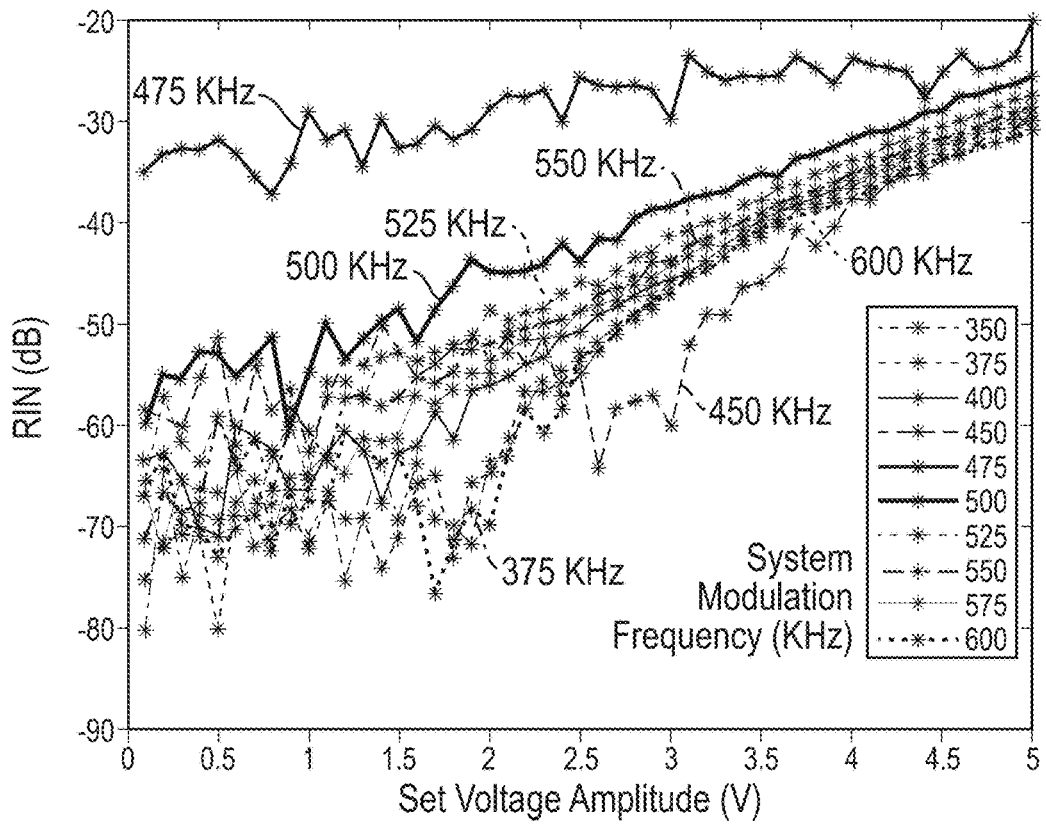

A unique attribute of operating a FOG (or any interferometric-based sensor) "on eigenfrequency" is that system noise cancels, and specifically RIN from the source cancels. When operating on eigenfrequency, there is little to no intensity noise. Intensity noise causes errors in both bias and scale factors, so RIN can introduce errors in the system at modulation frequencies that are not eigenfrequencies. In-situ RIN measurement via single or dual frequency modulation allows for real time compensation of RIN. This allows for compensation of modulator inefficiencies while operating, which may otherwise require higher drive voltages and a corresponding higher RIN component. Increased drive voltages due to environmental or age based effects cause increased RIN, which can in turn cause system performance issues and accuracy degradation when subjected to off eigen operation. FIGS. 1A and 1B illustrate RIN response with respect to set voltage (i.e., drive voltage) for a number of modulation frequencies. FIG. 1A shows the Residual Amplitude Modulation (RAM) ratio on the vertical axis, while FIG. 1B shows the RIN in dB on the vertical axis. RIN at eigenfrequency (477 kHz in this example FOG system) shows large value due to indeterminate 0/0 division. It can be shown that RIN does not affect the on-eigen operation of the interferometer.

Figure 2:
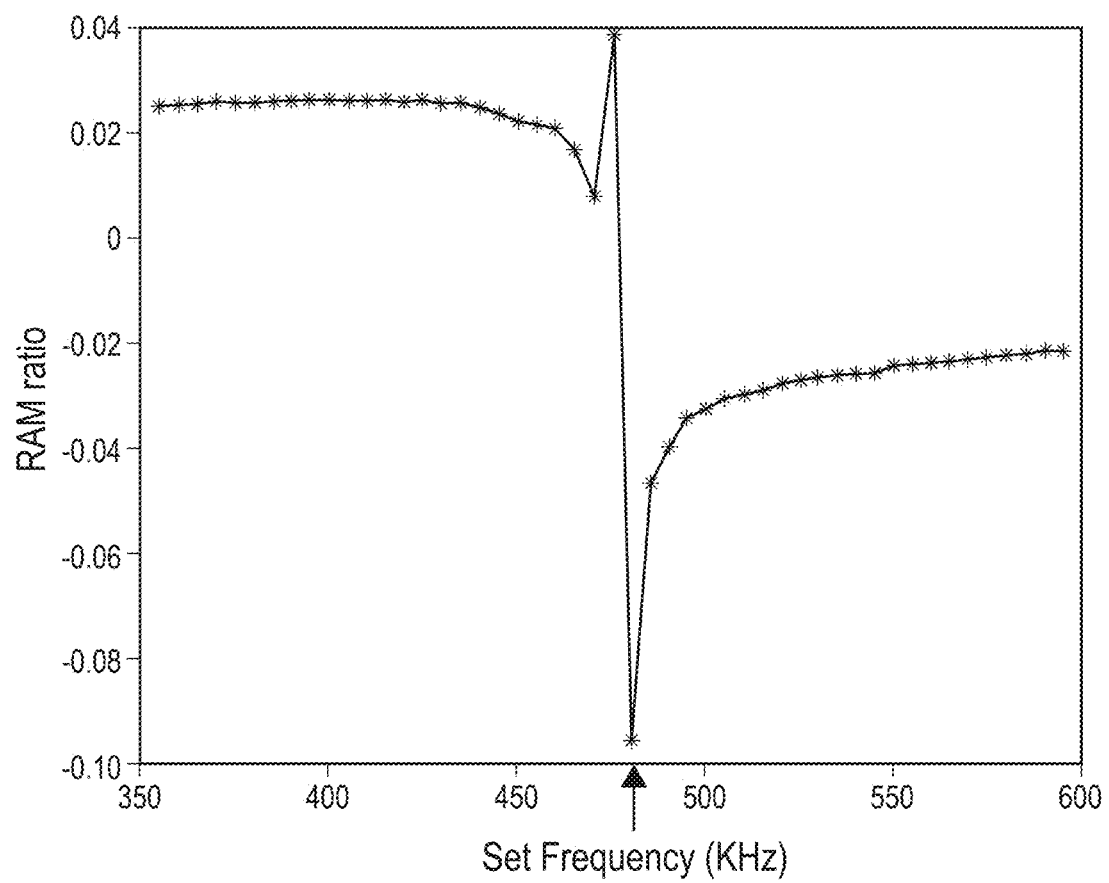
FIG. 2 illustrates the RIN component response across a frequency range that includes the example FOG system's eigenfrequency.

On eigen and double eigen measurement of RIN allows for the compensation of the scale factor error that may be present due to increased RIN contributions at off-eigen frequency conditions. (e.g., slow control loop response, high speed environmental changes or unforeseen errors resulting in off eigen operation and excess RIN). In-situ RIN measurements allow for eigenfrequency compensation in real time when the system is forced off its eigenfrequency, which can occur due to physical changes in the sensor, more specifically the Sagnac sensing coil. Such changes may be due to, for example, temperature, vibration, and aging. FIG. 2 illustrates the RIN component response across a frequency range that includes the example FOG system's eigenfrequency (477 kHz).

When a phase modulator is inserted and operated in an interferometer system (e.g., a Sagnac interferometer), the two counterpropagating, interfering waves will have amplitude modulation introduced due to the phase modulation. The two interfering waves have the equations of the form:

$$E_{cw} = a(1 + \Delta \sin \omega t\ t) e^{i\phi + i\psi_0 \sin \omega t}$$

$$E_{ccw} = a(1 + \Delta \sin \omega(t-T)) e^{-i\phi + i\psi_0 \sin \omega(t-T)}$$

Figure 3A:
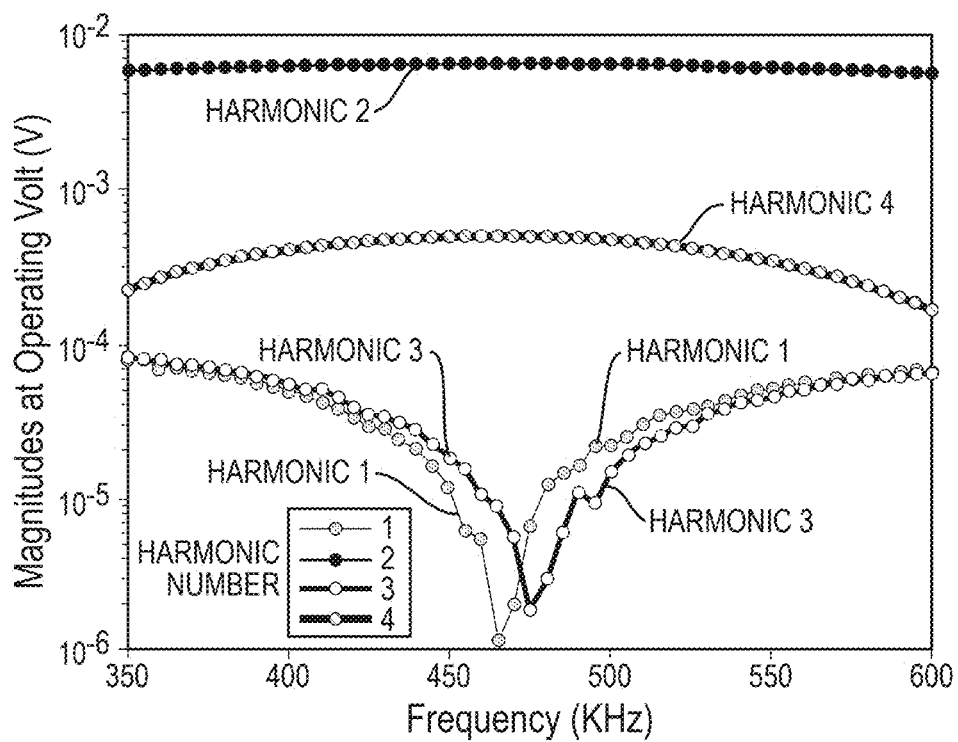
FIGS. 3A and 3B show harmonic magnitudes across a range of modulating frequencies from 350 KHz to 600 KHz, with FIG. 3A showing harmonic magnitudes calculated using equations, and FIG. 3B showing harmonic magnitudes as measured in an example FOG system.
Figure 3B:
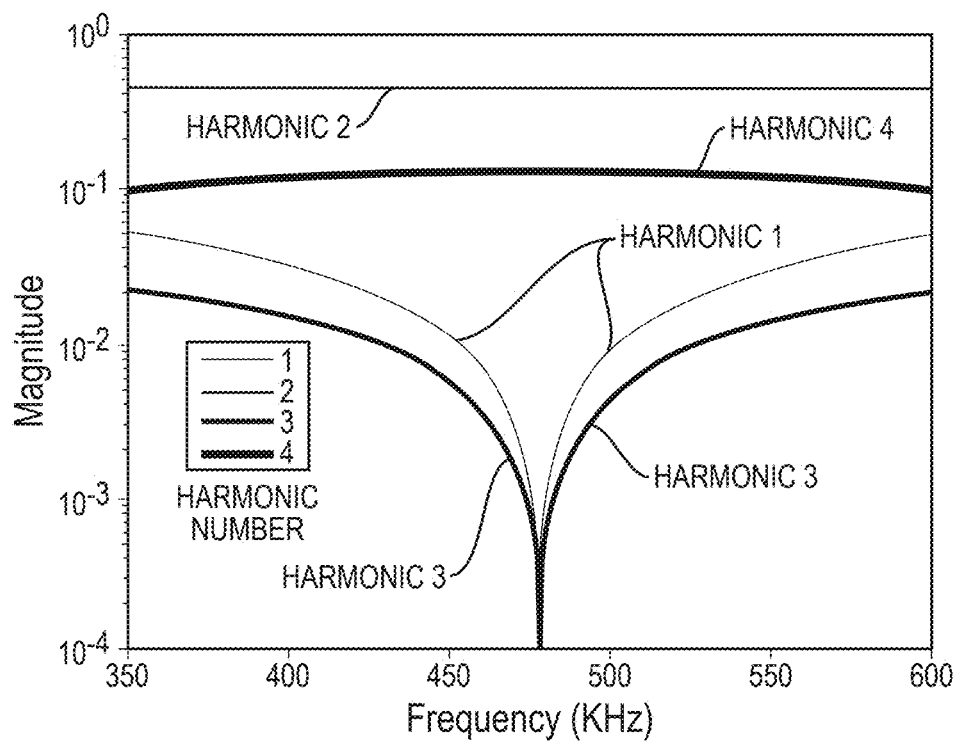

Such a set of fields produces harmonics at the detector as:

$$I_1 = -A\left[\left(1 + \frac{\Delta^2}{2}\cos(\omega T)\right)J_1(2\psi) + \frac{\Delta^2}{4}(J_{-1}(2\psi) + J_3(2\psi))\right]\sin(2\phi)$$

$$Q_1 = A\Delta\cos\left(\frac{\omega T}{2}\right)[1 + (J_0(2\psi) + J_2(2\psi))\cos(2\phi)]$$

$$I_2 = -A\frac{\Delta^2}{4}\cos(\omega T) - $$

$$A\left[\left(1 + \frac{\Delta^2}{2}\cos(\omega T)\right)J_2(2\psi) + \frac{\Delta^2}{4}(J_0(2\psi) + J_4(2\psi))\right]\cos(2\phi)$$

$$Q_2 = -A\Delta\cos\left(\frac{\omega T}{2}\right)[J_1(2\psi) + J_3(2\psi)]\sin(2\phi)$$

$$I_3 = A\left[\left(1 + \frac{\Delta^2}{2}\cos(\omega T)\right)J_3(2\psi) + \frac{\Delta^2}{4}(J_1(2\psi) + J_5(2\psi))\right]\sin(2\phi)$$

$$Q_3 = -A\Delta\cos\left(\frac{\omega T}{2}\right)[J_2(2\psi) + J_4(2\psi)]\cos(2\phi)$$

$$I_4 = A\left[\left(1 + \frac{\Delta^2}{2}\cos(\omega T)\right)J_4(2\psi) + \frac{\Delta^2}{4}(J_2(2\psi) + J_6(2\psi))\right]\cos(2\phi)$$

$$Q_4 = A\Delta\cos\left(\frac{\omega T}{2}\right)[J_3(2\psi) + J_5(2\psi)]\sin(2\phi)$$

where $I_n$ and $Q_n$, are $n^{th}$ harmonic of in-phase and quadrature components, respectively, $\Delta$ is Residual Amplitude Modulation (RAM), A is a constant that depends on detector responsivity and power, and $\phi$ is phase difference between the counter-propagating fields. Utilizing the dual frequency bursting method, the measurement of RIN becomes independent. FIGS. 3A and 3B show harmonic magnitudes from 350 KHz to 600 KHz, with FIG. 3A showing harmonic magnitudes calculated with the $I_n$ and $Q_n$ equations above, and FIG. 3B showing harmonic magnitudes as measured in the example FOG system.

RAM can be measured several ways using the harmonic equations above, and multiple combinations of the harmonic frequency components can be utilized in the determination of RIN.

For a dual modulation embodiment of the invention, a RIN measurement technique may measure, during a first interval of time, a ratio of two of the system's harmonics at a modulation frequency that is the system eigenfrequency. An example of such a ratio may be $F1(f_{eig})/F2(f_{eig})$, where F1 is a first system harmonic, F2 is a second system harmonic, and $f_{eig}$ is the system eigenfrequency. The RIN measurement technique may subsequently measure, during a second interval of time, a ratio of two of the system's harmonics at a modulation frequency that is twice the system eigenfrequency. An example of such a ratio may be $F1(2f_{eig})/F2(2f_{eig})$.

The harmonics F1 and F2 may be any two harmonics of the system. Measuring the ratio $F1(f_{eig})/F2(f_{eig})$ provides a measure of RIN that is independent of optical power. Measuring the ratio $F1(2f_{eig})/F2(2f_{eig})$, i.e., the harmonics F1 and F2 at twice the eigenfrequency, provides a measure of RIN that is independent of relative phase, optical power, and drive amplitude.

Modulation timing at $f_{eig}$ and $2f_{eig}$ can be sequential, random, pseudo random or any combination of sequences in a single axis FOG unit. The timing of the modulation sequence can be altered, but adjacent measurements of harmonic 1 and harmonic 2 should be utilized for the calculation of RIN.

Calculation of RIN utilizing dual frequency modulation can be obtained by the equations:

$$F_{first\_hrm}(2f_{eig}) = A\Delta[1 + \cos(2\phi)]$$

$$F_{second\_hrm}(2f_{eig}) = A\frac{\Delta^2}{4}[1 + \cos(2\phi)]$$

Where, $F_{first\_hrm}$ is the magnitude of the first harmonic at twice the system eigenfrequency, $F_{second\_hrm}$ is the magnitude of second harmonic at twice the system eigenfrequency, $\Delta$ is Residual Amplitude Modulation (RAM), A is a constant that depends on detector responsivity and power, and $\phi$ is phase difference between the counter-propagating fields. The ratio of $F_{second\_hrm}$ to $F_{first\_hrm}$, which is a direct measure of RIN, is independent of power, detector response, operating voltage and phase.

Figure 4A:
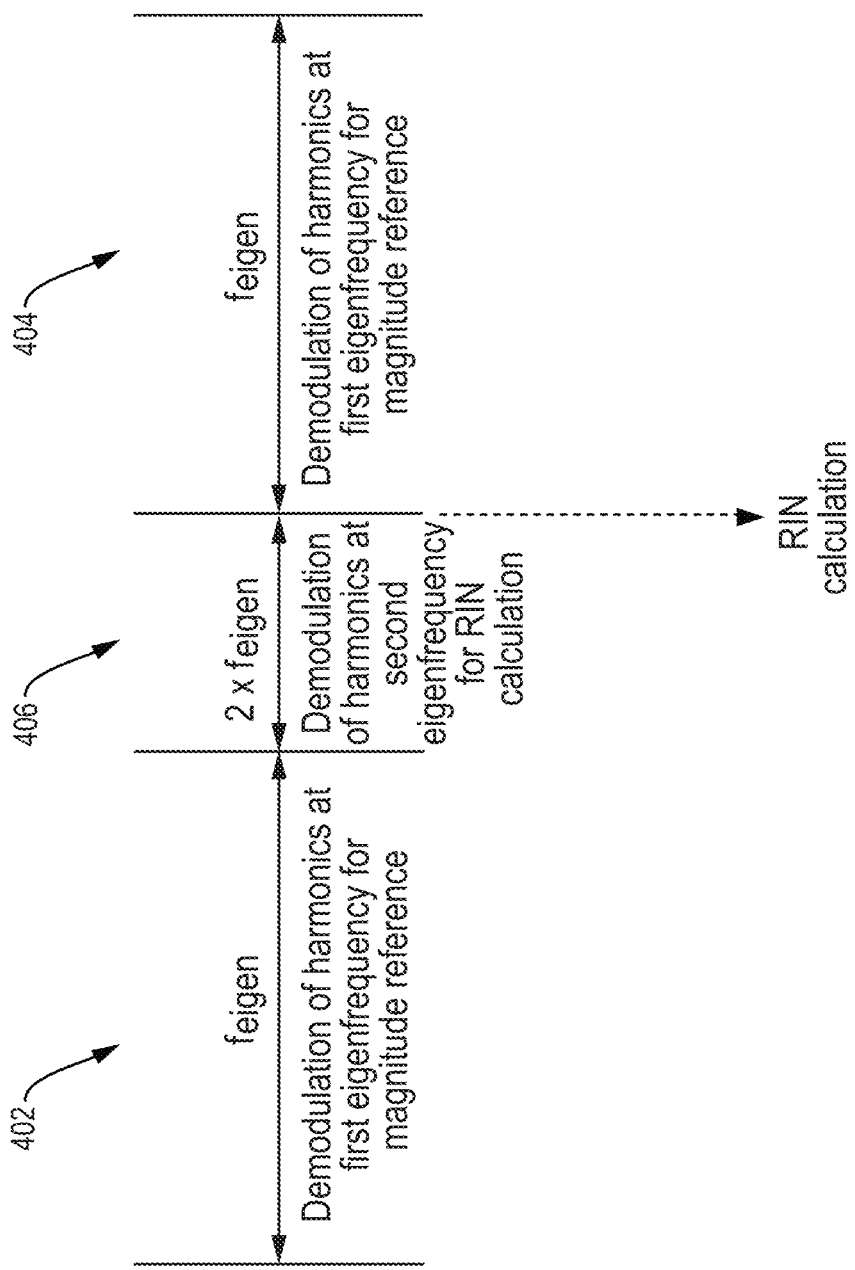
FIG. 4A shows a diagram that demonstrates a modulation burst method according to one embodiment of the invention.

FIG. 4A shows a diagram that demonstrates a modulation burst method according to one embodiment of the invention. During the first interval 402 and the third interval 404 shown, the system modulation is at the system eigenfrequency ($f_{eig}$), and the FOG system measures the rotation rate of the fiber optic coil. During the second interval 406 shown, the system is modulated at twice the system eigenfrequency (i.e., 2 $f_{eig}$). It is during this second interval 406 that the RIN value is measured using the harmonic ratio, as described herein. The eigenfrequency of a fiber-optic gyroscope (FOG) based system may be determined according to 1/(2τ), where τ represents the transit time of the FOG's Sagnac coil.

Figure 4B:
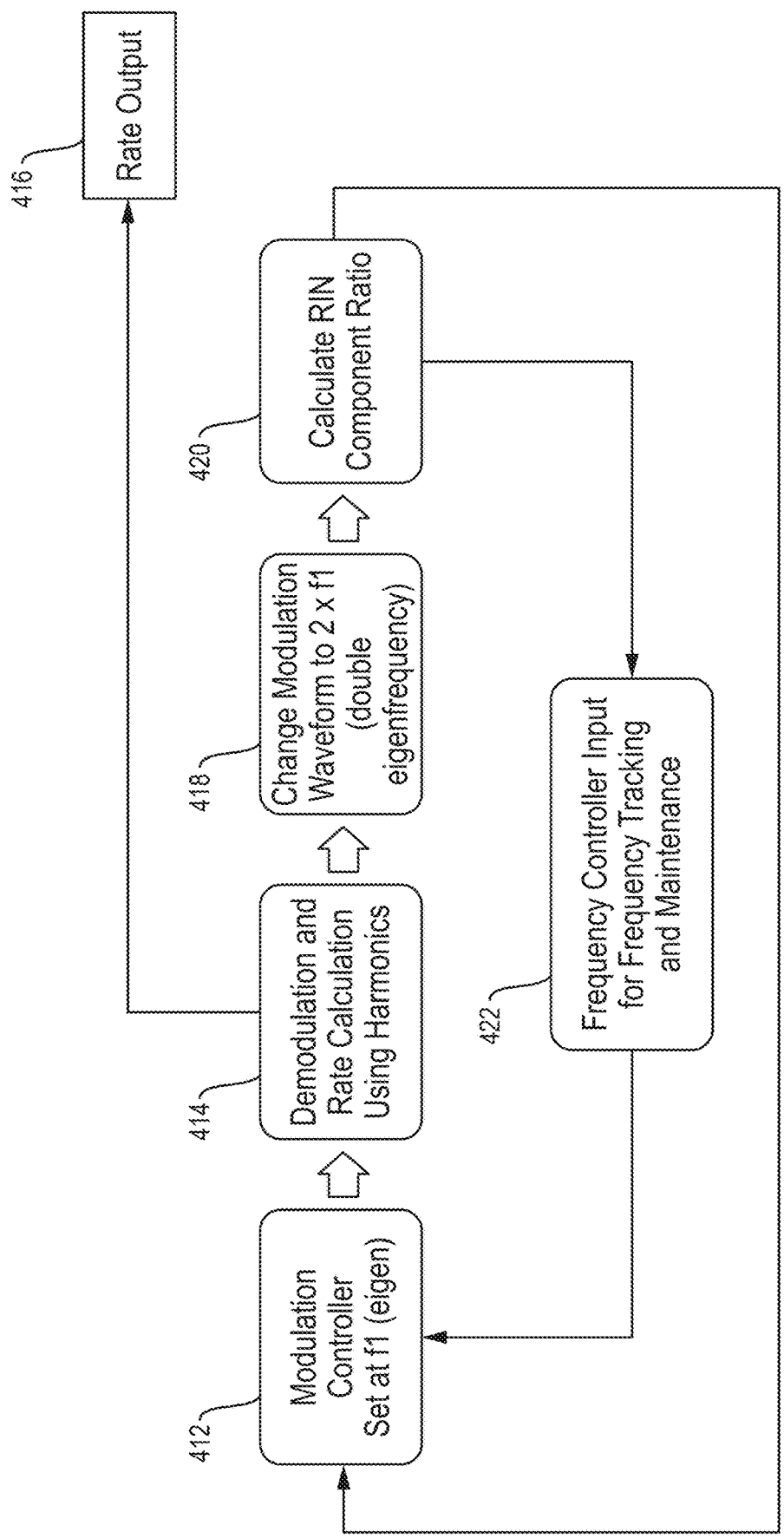
FIG. 4B shows a flow diagram consistent with the described embodiments.

FIG. 4B shows a flow diagram consistent with the described embodiments. Initially, a modulation controller may set 412 the modulation frequency at the system eigenfrequency. Demodulation and a rate calculation occurs 414, thereby providing a rate output 416 (e.g., rotation rate of the fiber coil). The modulation controller may set 418 the modulation frequency at twice the system eigenfrequency, and the RIN is determined 420 as described herein. The RIN calculation may be used to adjust 422 the modulation frequency to be consistent with the actual determined system eigenfrequency.

Figure 5:
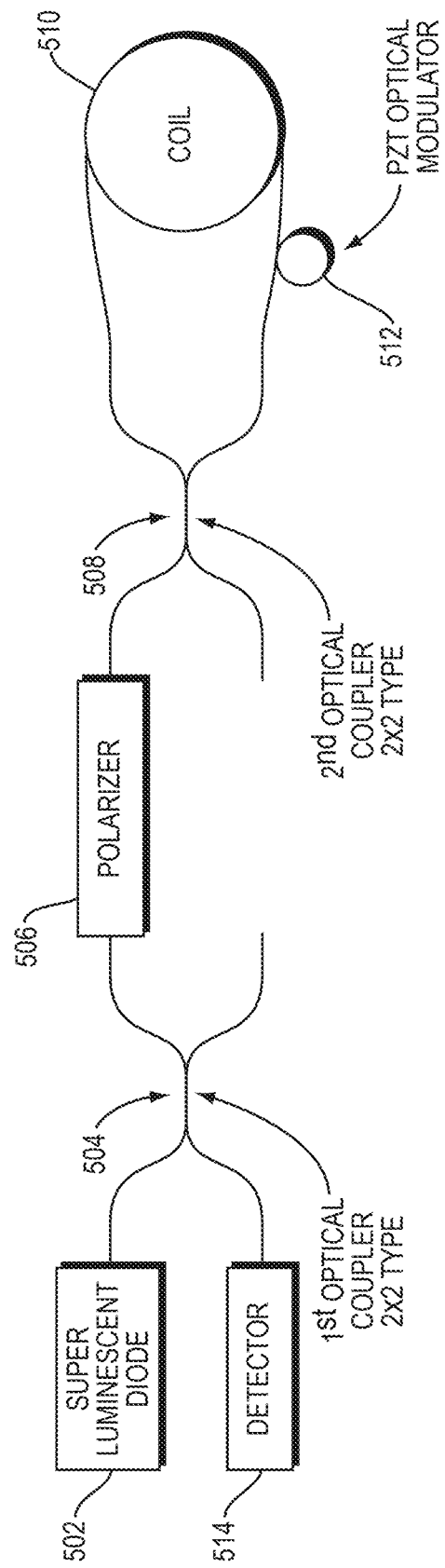
FIG. 5 illustrates an example embodiment of a single-axis 2×2 optical FOG circuit.

FIG. 5 illustrates an example embodiment of a single-axis 2×2 optical FOG circuit, comprising a super luminescent diode (SLD) 502, a first 2×2 (i.e., two inputs, two outputs) optical coupler 504, a polarizer 506, a second optical coupler 508, a fiber coil 510, a PZT optical modulator 512, and a photodetector 514. The "2×2" designation for the "2×2 optical FOG circuit" refers to the fact that the optical circuit shown in FIG. 5 has two ports at one end (corresponding to the SLD 502 and the detector 514), and two ports at the other end (corresponding to the two ports of the fiber coil 510).

Figure 6:
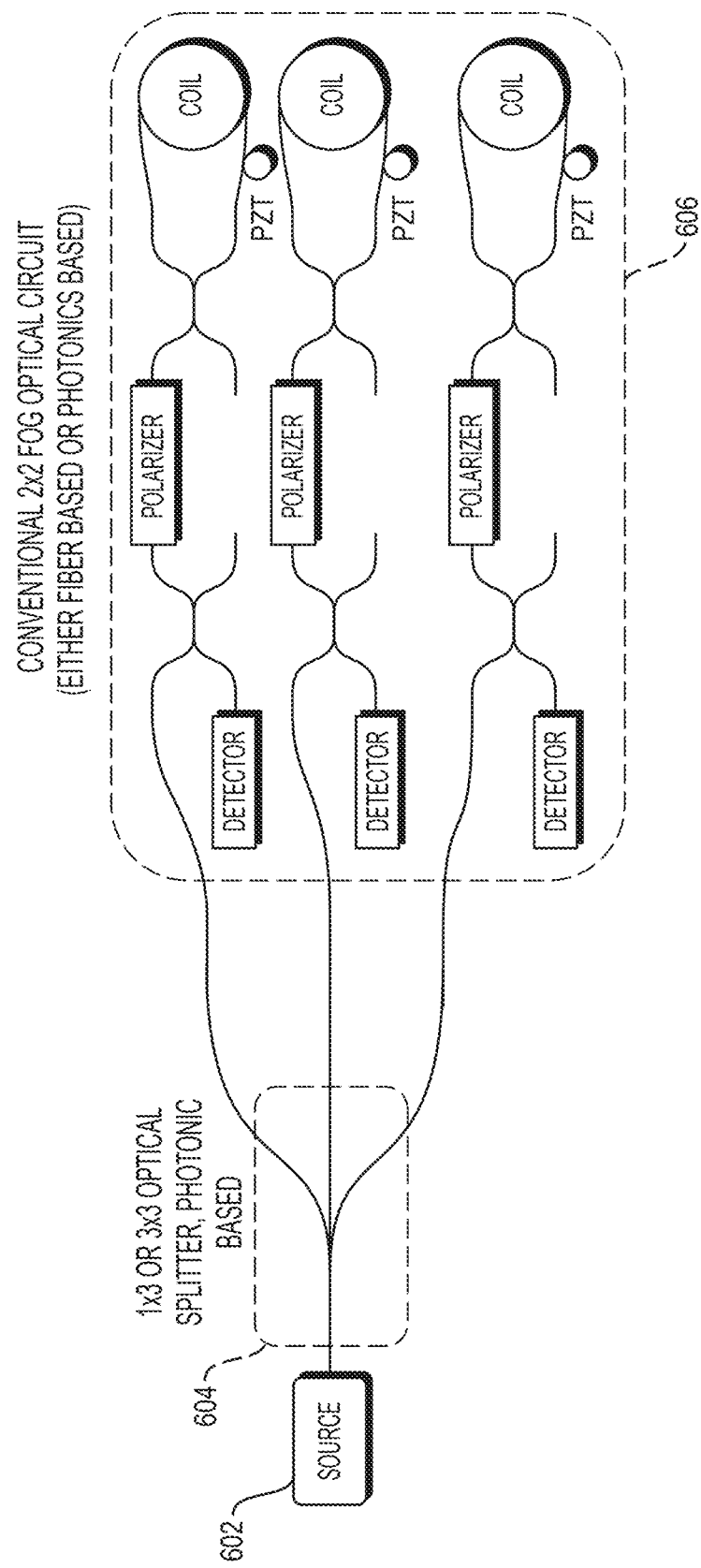
FIG. 6 shows a high-level diagram of an example embodiment of a power balanced, 3-axis photonic FOG system.

FIG. 6 shows a high-level diagram of an example embodiment of a power balanced, 3-axis photonic FOG system. The FOG system may comprise a number of subsystems, for example a light source 602, a 1×3 coupler 604, followed by the conventional 2×2 FOG optical circuits 606 that was described with respect to FIG. 5.

In some embodiments, the subsystems depicted in FIG. 6 may all be implemented on a single photonic integrated circuit (PIC). In other embodiments, one or more of the individual subsystems may be implemented on separate PIC devices, with the separate PIC devices connected with optical fiber or other optical waveguides. In some embodiments, components that are likely to dissipate heat during operation (e.g., the SLD 602 and the PZT modulators) may be arranged separate from passive components (e.g., 1×3 coupler 604 and 2×2 FOG optical circuits 606), so that one or more of the active (heat-dissipating) components is disposed on a first PIC, and one or more of the passive devices is disposed on a second PIC. An example PIC FOG may incorporate the conventional 3-axis inertial measurement unit (IMU) or inertial navigation system (INS) into one PIC chip, either with an onboard 1×3 coupler to utilize a single source, or an external source and 1×3 coupler.

Figure 7:
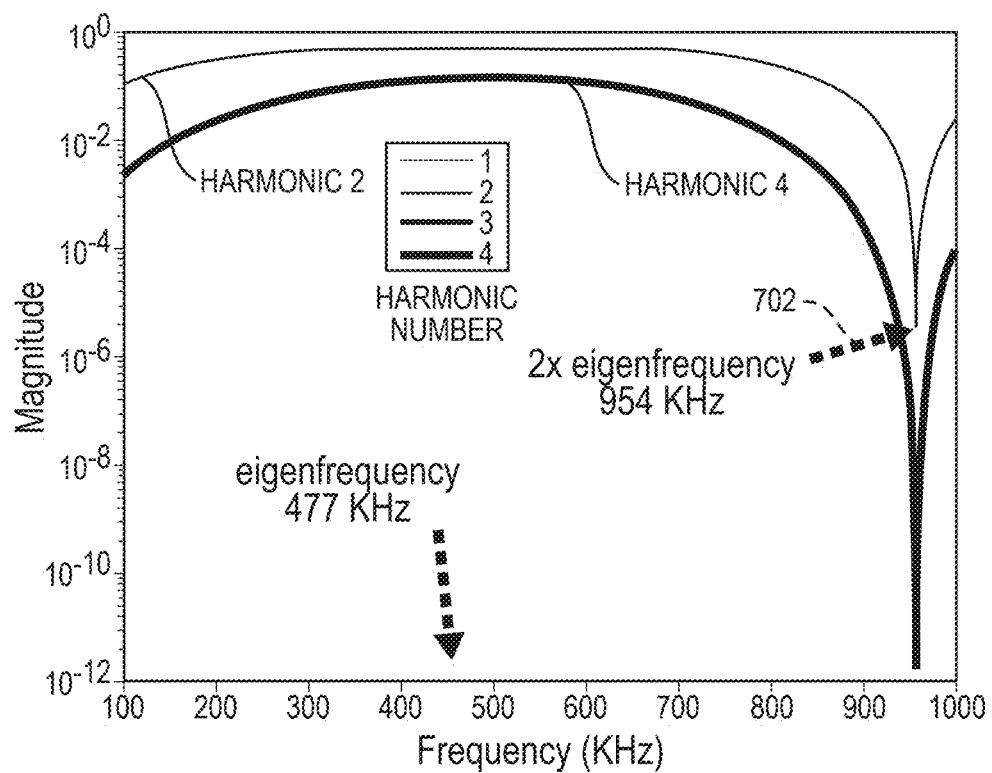
FIG. 7 shows an example FOG system in a stationary condition (no rotation), with zero RIN.
Figure 8:
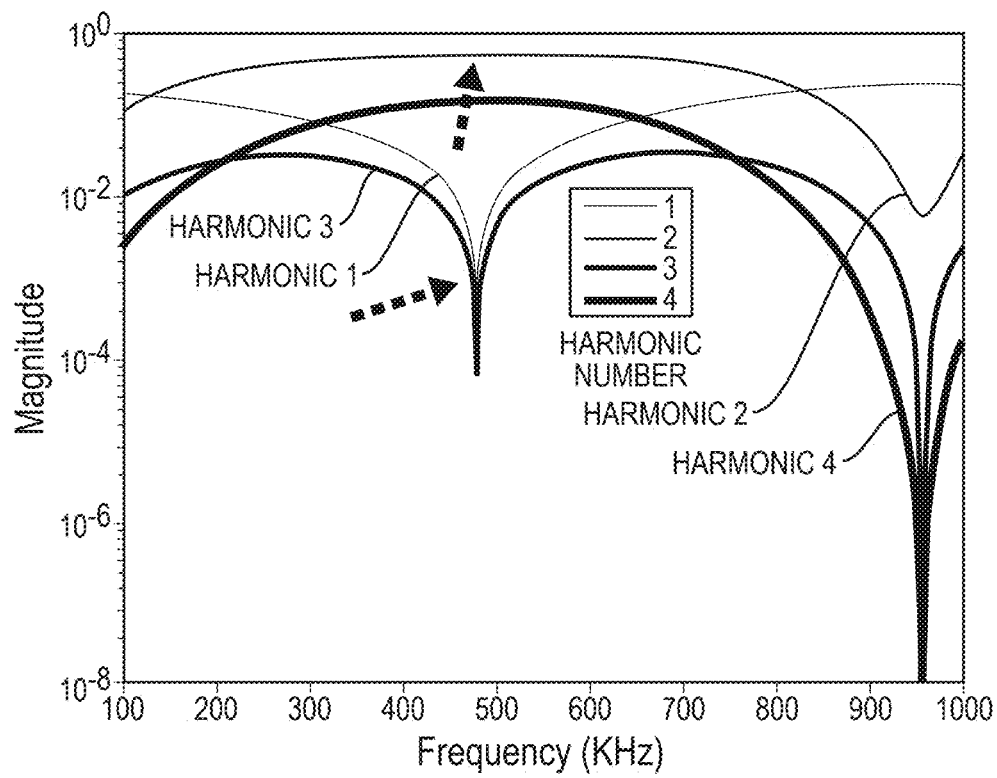
FIG. 8 shows the example FOG system in its stationary condition (no rotation), with a non-zero RIN.

FIG. 7 shows an example FOG system in a stationary condition (i.e., with no rotation of the fiber optic sensing coil, and therefore no Sagnac phase shift) and with a zero RIN. FIG. 8 shows the example FOG system in its stationary condition but with a non-zero RIN. While the FOG system is in its stationary condition, a "zero RIN" measurement can be made by monitoring the magnitude response at the eigenfrequencies. As shown in FIG. 7, a notch 702 occurs for the second and fourth harmonics at twice the system eigenfrequency, i.e., at 954 KHz. FIG. 8 shows that in a non-zero RIN condition, the first and third harmonics exhibit notches at the eigenfrequency (477 KHz), while the second, third and fourth harmonics exhibit notches at twice the eigenfrequency (954 KHz).

Some embodiments may employ a RIN measurement technique for eigenfrequency maintenance that uses only a single harmonic frequency. Under rotation of the Sagnac fiber optic coil, the measurement of the magnitudes of the first harmonic F1 at modulation frequencies of $f_{eig}$ and $2f_{eig}$ can be utilized to determine appropriate on eigen operation. Maximizing the delta of the magnitude of the first harmonic F1 at the eigenfrequency $f_{eig}$ and the magnitude of the first harmonic F1 at twice the eigenfrequency $2f_{eig}$. The on eigenfrequency condition maximizes the differential value of:

$RIN = F1(f_{eig}) - F1(2f_{eig})$

When the system drifts away from the "on eigenfrequency" condition, the value of the above RIN differential decreases, and an associated control loop operates to maximize the differential and restore "on eigenfrequency" operation. The control loop thus operates to maintain eigenfrequency operation.

Figure 9:
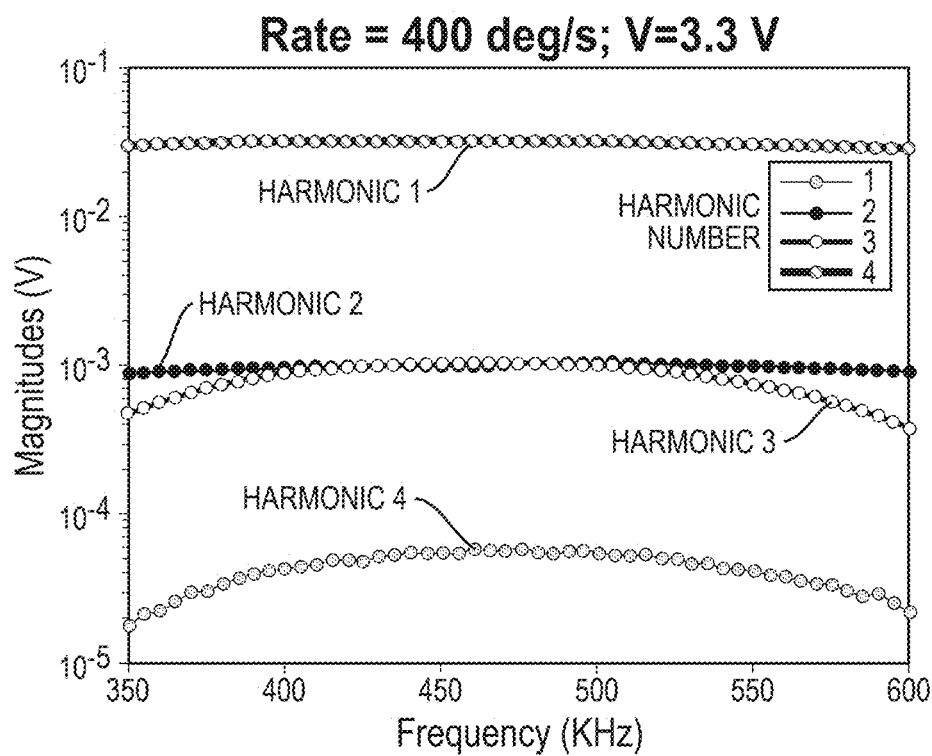
FIGS. 9 and 10 show magnitudes of harmonics of a FOG system under rotation, with non-zero RIN.
Figure 10:
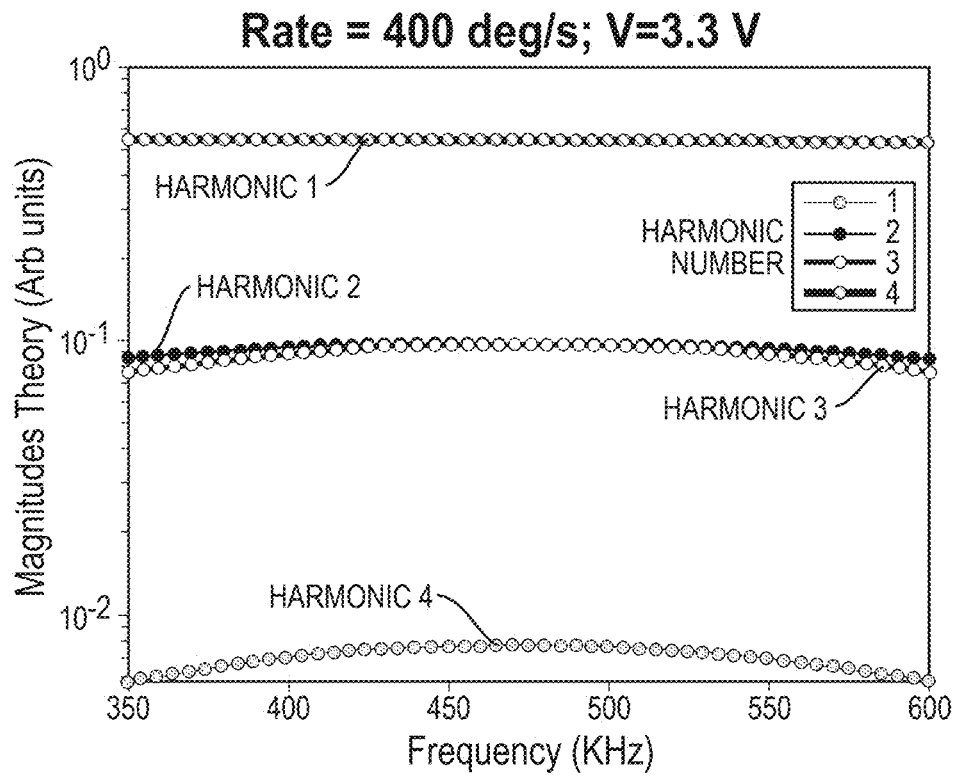

FIGS. 9 and 10 show magnitudes of harmonics of a FOG system under rotation (400 degrees per second) with non-zero RIN. FIG. 9 depicts measured harmonic magnitudes, while FIG. 10 depicts calculated harmonic magnitude using the equations described herein.

Figure 11:
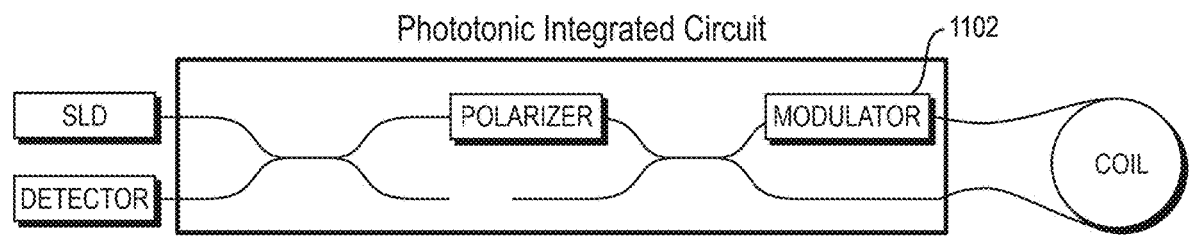
FIGS. 11, 12, and 13 illustrate three example embodiments of photonic integrated circuit (PIC) fiber optic gyroscope (FOG) implementations.
Figure 12:
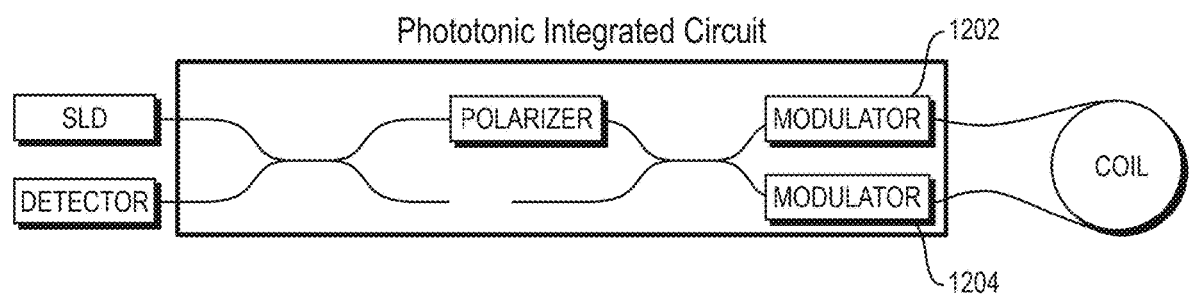
Figure 13:
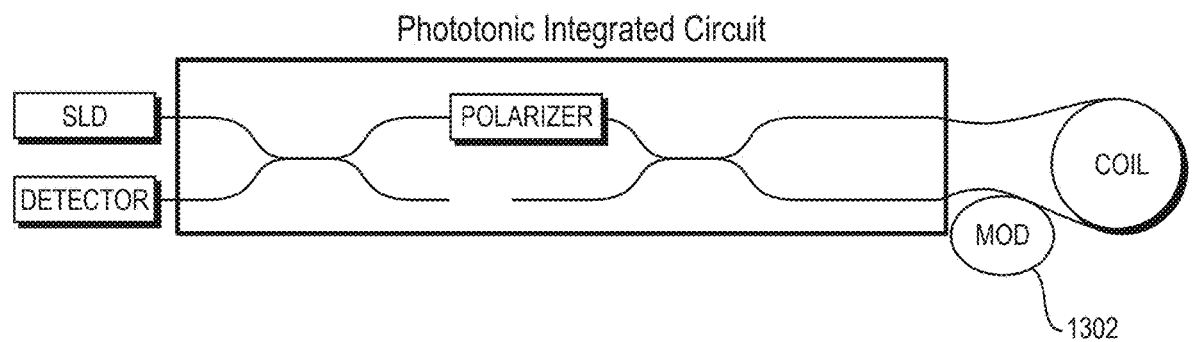

FIGS. 11, 12, and 13 illustrate three example embodiments of photonic integrated circuit (PIC) fiber optic gyroscope (FOG) implementations that may be used to realize the described embodiments. FIGS. 11, 12, and 13 include architectures similar to those described with respect to FIGS. 5 and 6.

The measurement techniques presented in the example embodiments described herein are valid with external modulators (e.g., lead zirconate titanate (PZT)), as well as PIC-based integrated modulators. FIGS. 11, 12, and 13 illustrate example use cases for potential FOG designs. FIG. 11 shows a PIC implementation of a FOG with a single integrated modulator 1102. FIG. 12 shows a PIC implementation of a FOG with dual integrated modulators 1202, 1204. FIG. 13 shows a PIC implementation with a modulator 1302 that is external to the PIC 1304.

While example embodiments have been particularly shown and described, it will be understood by those skilled in the art that various changes in form and details may be made therein without departing from the scope of the embodiments encompassed by the appended claims.

What is claimed is:

1. A method of determining residual intensity noise (RIN) of a sensor, comprising:
    determining a first amplitude of a first harmonic of the sensor while a signal propagating through the sensor is modulated at a modulating frequency corresponding to twice an eigenfrequency of the sensor;
    determining a second amplitude of a second harmonic of the sensor while the signal propagating through the sensor is modulated at the modulating frequency; and
    determining the RIN of the sensor as a ratio of the first amplitude and the second amplitude.

2. A method of determining residual intensity noise (RIN) of an interferometer system, comprising:
    propagating a light signal from a light source through the interferometer system;
    modulating the light signal at a modulating frequency that is twice an eigenfrequency of the interferometer system;
    determining a first harmonic amplitude and a second harmonic amplitude produced by the interferometer system; and
    determining the RIN of the interferometer system as a ratio of the first harmonic amplitude and the second harmonic amplitude.

3. A method of determining residual intensity noise (RIN) of an interferometer system, comprising:
    propagating a light signal from a light source through the interferometer system;
    during a first interval, modulating the light signal at a first modulating frequency that is an eigenfrequency of the interferometer system, and determining a primary measurement associated with the interferometer system;
    during a second interval:
        (i) modulating the light signal at a first modulating frequency that is twice the eigenfrequency of the interferometer system;
        (ii) determining, using an optical detector, a first harmonic amplitude and a second harmonic amplitude produced by the interferometer system; and
        (iii) determining the RIN of the interferometer system as a ratio of the first harmonic amplitude and the second harmonic amplitude.

4. A method of tracking an eigenfrequency of an interferometer system, comprising:
    determining residual intensity noise (RIN) of a sensor by:
        determining a first amplitude of a first harmonic of the sensor while a signal propagating through the sensor is modulated at a modulating frequency corresponding to twice a predetermined eigenfrequency of the sensor;
        determining a second amplitude of a second harmonic of the sensor while the signal propagating through the sensor is modulated the modulating frequency; and
        determining the RIN of the sensor as a ratio of the first amplitude and the second amplitude;
    repeating the step of determining RIN of the sensor using a modulating frequency selected from a range of frequencies that is centered about the predetermined eigenfrequency;
    determining a modulating frequency from the range of frequencies that produces a minimal determined RIN; and
    designating the modulating frequency corresponding to the minimal determined RIN as an updated eigenfrequency of the system.

* * * * *